United States Patent [19]

Chevallier

[11] Patent Number: 4,459,518
[45] Date of Patent: Jul. 10, 1984

[54] WINDOW WIPER

[75] Inventor: Pierre Chevallier, Boulogne-Billancourt, France

[73] Assignees: Regie Nationale des Usines Renault; Automobiles Peugeot, both of Paris, France

[21] Appl. No.: 475,714

[22] Filed: Mar. 21, 1983

Related U.S. Application Data

[63] Continuation of Ser. No. 686,495, May 14, 1976, abandoned.

[30] Foreign Application Priority Data

May 16, 1975 [FR] France ................................ 75 15319

[51] Int. Cl.$^3$ ................................................. B60S 1/02
[52] U.S. Cl. ........................................ 318/286; 318/10
[58] Field of Search ..................... 310/68 B, 68 D, 69, 310/70, 239; 318/DIG. 2, 282, 286, 447, 443, 466, 9, 10

[56] References Cited

U.S. PATENT DOCUMENTS 4,259,624  3/1981  Seibicki ............................... 318/282

FOREIGN PATENT DOCUMENTS 912397  6/1961  United Kingdom ......... 318/DIG. 2

Primary Examiner—Stanley J. Witkowski
Assistant Examiner—Arthur G. Evans
Attorney, Agent, or Firm—Fleit, Jacobson, Cohn & Price

[57] ABSTRACT

A device for extending the operating time of a glass wiping system comprises a motor and reduction gear unit, a fixed-stop member for automatically stopping said motor at a fixed position and a complementary reduction gear driven from the output member of said reduction gear unit, said device being rigid with said fixed stop member, the necessary control action occurring only after several revolutions of said output member.

4 Claims, 14 Drawing Figures

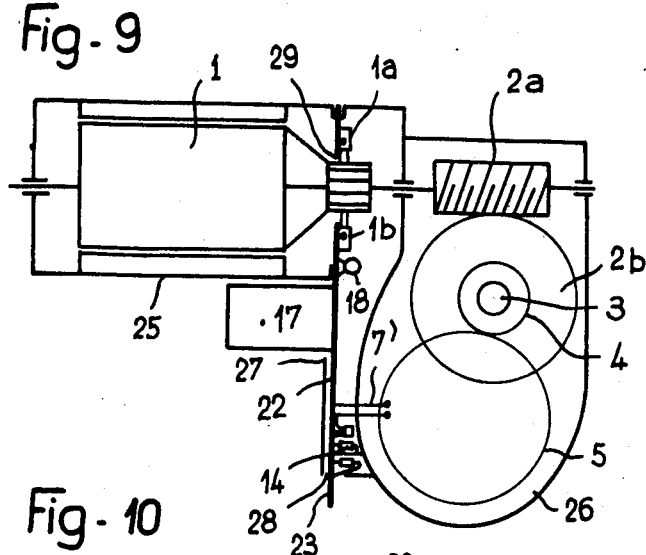
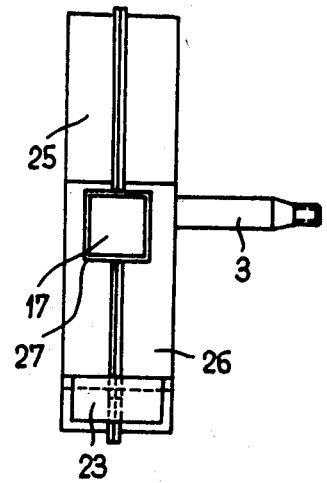
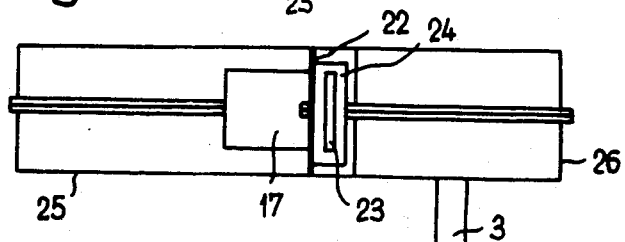
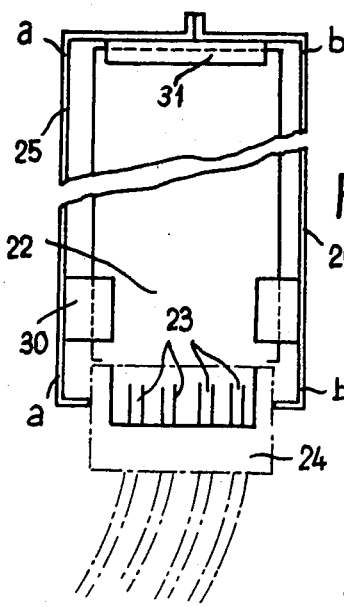
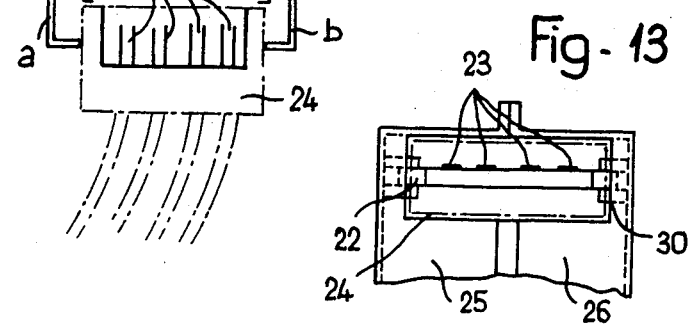
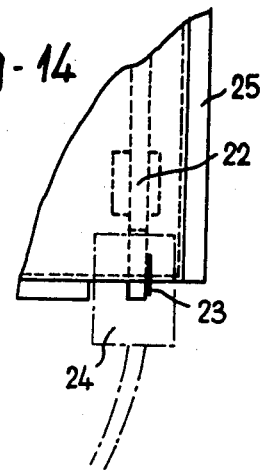

WINDOW WIPER

This application is a continuation of application Ser. No. 686,495, filed May 14, 1976, now abandoned.

The invention relates to improvements in devices for cleaning the transparent surfaces of motor vehicles, notably electric-driven wipers operating at will during more or less extended time periods, more particularly for cleaning windscreens, backlights and headlamps.

A continuous operation of glass wipers is not always required nor convenient, but frequent ON and OFF switchings of these devices are rather tedious for the driver.

Electronic or thermal devices are already known which provide automatically from a simple control impulse either a periodic operation of the device during a predetermined number or reciprocations of the wipers at regular time intervals, or a combination of these two modes of operation.

Now these known devices are on the one hand rather expensive and on the other hand difficult to fit, notably in the case of an optional equipment not contemplated in a mass-produced car model.

It is the essential object of the present invention to improve the operation of conventional wipers by simply adding thereto a single device adapted to extend the operating time of the cleaning arms and blades, this device being simple to manufacture and therefore economical, and free of any adjustment.

The device according to this invention can also be associated with simplified electronic rate-controlling or timing means incorporated in the wiper motor.

The device according to this invention, applicable to a windscreen wiper mechanism operated by an electric motor coupled through a worm and wheel reduction gear to an automatically-controlled fixed-stop member, is characterised essentially in that it comprises a reduction gear driven from the output member of said worm and wheel gear and rigid with the member controlling the fixed-stop member, the operation of this control member occurring only after several revolutions of said output member.

According to other features characterising this invention, the device for extending the operation of the windscreen wiper is associated with a simplified electronic system controlling the rate of operation of the wiper blades, which system is incorporated in the wiper motor, said device and system constituting a unit incorporated in a motor and reduction gear assembly.

A clearer understanding of the present invention will be obtained from the following disclosure of typical forms of embodiment of the invention given by way of example and illustrated diagrammatically in the attached drawings, in which:

FIGS. 9, 10 and 11 are diagrammatic views, i.e. respectively a plane view, an elevational view and a side elevational view, of a device assembled with the motor and reduction gear unit, and FIGS. 12, 13 and 14 illustrate details of the mounting of the plate and switch means of FIG. 7 in the case of the motor and reduction gear unit.

Figure 1:
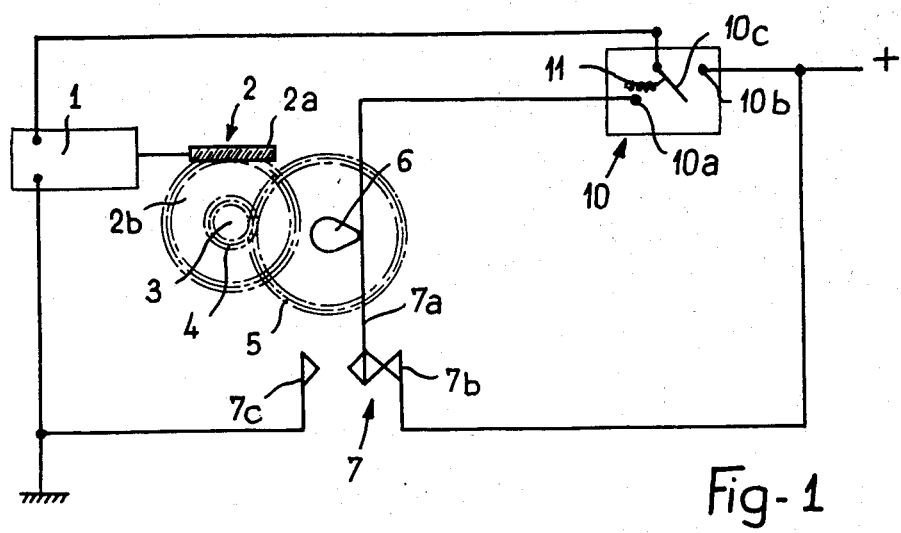
FIG. 1 is a wiring diagram illustrating a device for extending the operation of the wiper system, of which the stop member comprises a contact control cam.

Referring first to FIG. 1, the wiper motor 1 comprises an output shaft driving a worm and wheel reduction gear 2 comprising in fact a worm 2a and a worm wheel 2b rigidly connected to a slow-rotating output shaft 3.

According to this invention, the output shaft 3 of the motor and reduction gear unit carries a pinion 4 meshing with a toothed wheel 5 rigid with the member adapted to stop the motor at the end of the preset wiping period. This member may consist, in a manner well known in the art, of a cam 6 rotatably solid with said toothed wheel 5 and adapted to actuate the movable arm 7a of a fixed stopping reversing switch 7 of which the fixed contacts 7b and 7c are connected to the positive terminal + of a storage battery and to the ground, respectively. In the inoperative position of the motor the cam 6 has its boss diametrically opposite the position shown in FIG. 1, in which the movable arm 7a engages the grounded fixed contact 7c.

Figure 2:
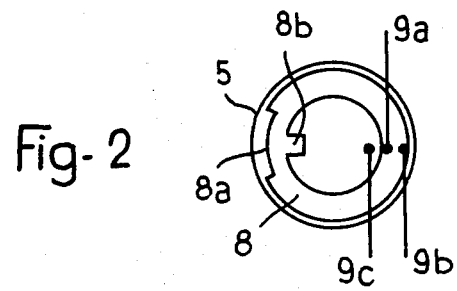
FIG. 2 is a modified form of embodiment of the stop member comprising a conducting track associated with contact brushes.

In a modified construction illustrated in FIG. 2, the automatic stop member may consist in a manner known per se of a conducting track 8 rigid with the toothed wheel 5 consisting in this case of insulating material and having formed along one segment a peripheral notch 8a and on its inner periphery a radial, inwardly directed stud 8b. A pair of brushes 9a and 9b (corresponding to contacts 7a and 7b respectively of FIG. 1) engage the conducting track 8 during the rotation of said toothed wheel 5; a third brush 9c (corresponding to contact 7c and grounded) engages the central portion of the side surface of wheel 5. Thus, in the inoperative position of wheel 5, this brush 9c will engage said radial stud, brush 9a will engage the track 8 and therefore be connected to brush 9c, and brush 9b will be insulated on the notched segment 8a of the track.

The movable blade 7a of reversing switch 7 (or the aforesaid brush 9a) is connected to a fixed-stop contact stud 10a of a control inverter 10 having its other fixed contact stud 10b (controlling the starting of the wiper motor) connected to the positive terminal + of the storage battery, the movable arm 10c being connected to one terminal of motor 1, the other motor terminal being grounded. A spring 11 constantly urges the movable contact arm 10c of control inverter 10 to its stop position.

When the movable contact arm 10c is moved to position 10b, the motor 1 is energized directly and started, thus rotatably driving the wheel 2b of reduction gear 2 and via pinion 4 the toothed wheel 5 rigid with said cam 6. Of course, this pinion 4 and the associated wheel 5 provide an additional gear reduction in the electric circuit control means. If the reduction ratio is N, cam 6 will rotate N times slower than the output shaft 3 of the reduction gear, in contast to the corresponding cams of hitherto known fixed-stop devices which rotate at the same speed.

When the cam 6 has moved the movable contact arm 7a of reversing switch 7 for engagement with contact 7b (or when the brush 9b has left the notched segment 8a of track 8), the movable contact arm 10c of inverter 10 can be released, the motor remaining energized from the positive battery terminal + via contact 7b, arm 7a, fixed contact 10a and movable arm 10c. The motor will keep operating until the cam 6 (or track 8) has accomplished a complete revolution, the movable arm 7a then re-engaging the fixed contact 7c of reversing switch 7 (or the inner stud 8b of track 8 resuming its engagement with contact 9c). Thus, the motor energization is discontinued and the motor armature is short-circuited through the movable contact arms 10c and 7a, thus stopping immediately the output shaft 3 of reduction gear 2 in a well-defined position depending on the angular timing or setting of cam 6 (or track 8).

If the reduction ratio of pinion 4 to wheel 5 is N, the output shaft 3 of the reduction gear will accomplish N revolutions during one revolution of cam 6 (or track 8) as long as the movable contact arm of control inverter 10 remains in engagement, this time being at the most equal to the time required for switch 7 to move from 7a–7c to 7a–7b.

Therefore, the number of revolutions N must compulsorily be an integer if it is desired that the position in which the output shaft 3 of the reduction gear is stopped remains invariable.

Figure 3:
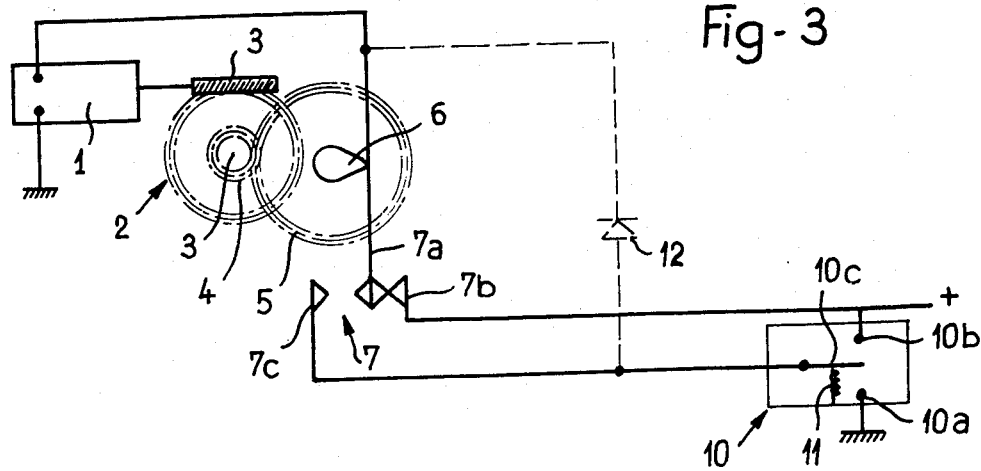
FIG. 3 is a modified form of embodiment of the control circuit of FIG. 1.

With the modified form of embodiment of the electric circuit of this invention illustrated in FIG. 3, a connecting wire can be dispensed with without altering the mode of operation of the device. In this diagram, the movable blade or contact arm 7a of the fixed-stop member 7 is connected to one terminal of motor 1 and the movable arm 10c of the control inverter 10 is connected to the fixed contact 7c of reversing switch 7. In this case, the switch 7 must be of the quick-break type without any position of equilibrium between positions 7a–7c and 7a–7b.

If an ordinary inverter or a track 8 is used, a re-energizing diode 12 must be provided between the movable arms 10c and 7a to prevent a permanent de-energization of the system.

Figure 4:
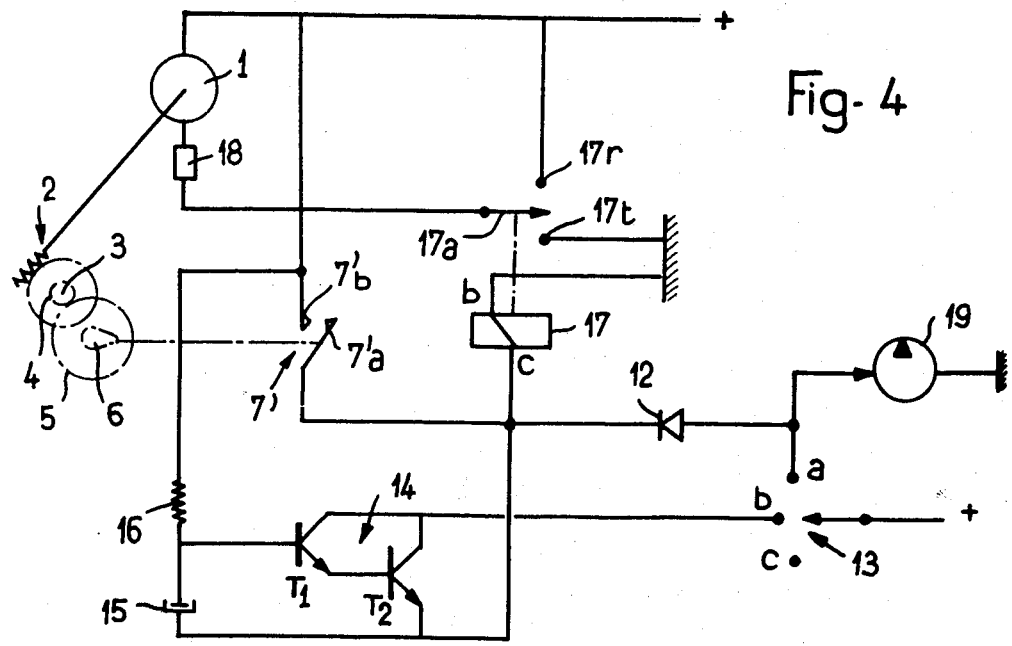
FIG. 4 is a diagram showing a device similar to that illustrated in FIG. 1, but comprising a stop member in the form of a contact-actuating cam.

In the modified construction illustrated in FIG. 4, a known type of rate control device is associated with the operating time protracting or extension device 1 through 7 of FIG. 1. For this purpose, a fixed-stop switch 7' having a movable contact 7'a responsive to the cam 6 and a fixed contact 7'b is substituted for the reversing switch of FIG. 1.

Figure 5:
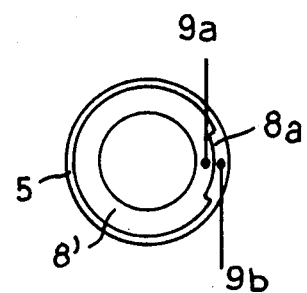
FIG. 5 shows a modified version of the assembly of FIG. 1, wherein the stop member consists of a track.

Another modification is illustrated in FIG. 5 in which a conducting track 8' is provided but without the stud 8b of FIG. 2, and only two brushes 9a and 9b are kept in the assembly.

A three-way switch 13 is substituted in this case for the transient-action control inverter 10, this switch 13 comprising three positions, namely a stop position c, a repeater operating position b and an operating time protracting position a. The movable contact arm of this switch is connected to the positive terminal + of the battery.

The wiper rate control device 14 comprises an NPN-type input transistor $T_1$ having its emitter connected to the base of an output transistor $T_2$ of same type, the collectors of both transistors $T_1$ and $T_2$ being connected to the fixed contact b of switch 13. A capacitor 15 is inserted between the base of input transistor $T_1$ and the emitter of output transistor $T_2$. A resistor 16 is connected between the base of transistor $T_1$ and the fixed contact 7'b of the fixed-stop switch 7', said fixed contact 7'b being connected in conjunction with one terminal of motor 1 to the positive terminal + of the storage battery. The emitter of output transistor $T_2$ is connected to one input terminal c of the energizing coil of a relay 17 having its output terminal b grounded, as shown. This relay controls a reversing switch having its movable contact arm 17a connected via a protection member 18, for example a circuit breaker, to the other terminal of motor 1. In this relay, a back contact 17r is connected to the + terminal of the battery and a front contact 17t is grounded.

The input terminal c of relay 17 is still connected on the one hand to the movable blade or arm 7'a of the automatic stop switch 7' and on the other hand via a diode 12 to the fixed contact a of switch 13.

If a windscreen washer equipment is contemplated and associated with the wiper, the washer pump 19 is connected between the fixed contact a (operating time extension) of switch 13 and the ground.

The above-described device operates as follows:

In the inoperative condition, the movable contact arm of switch 13 is in position c and the fixed stop switch 7 is open. Relay 17 is de-energized and its movable contact arm is in its inoperative position 17r, thus short-circuiting the armature of motor 1. Capacitor 15 is charged, being connected on one side through resistor 16 to the positive terminal + of the battery and on the other side through the coil of relay 17 to the ground. Both transistors $T_1$ and $T_2$ are blocked.

When the movable arm of control switch 13 is subsequently moved from position c to position b (timed operation position) both transistors $T_1$ and $T_2$ become operative due to the charge of capacitor 15 which causes the base of transistor $T_1$ to be biased positively. Since transistor $T_2$ is again conducting, relay 17 is energized and thus its movable contact arm 17a is caused to move from back contact 17r to front contact 17t so as to close the energizing circuit of motor 1, and therefore this motor will drive the cam 6 (or track 8'). The cam 6 will thus close switch 7', whereby the coil of relay 17 will be energized directly through this switch. Capacitor 15 is thus discharged through the circuit comprising resistor 16 and transistors $T_1$ and $T_2$. Since transistor $T_1$ is not biased positively, both transistors $T_1$ and $T_2$ will be blocked. When the cam 6 (or track 8') has completed one revolution, switch 7' will open and cause de-energization of relay 17. The movable arm 17a of this relay 17 will resume its inoperative position 17r, thus short-circuiting the armature of motor 1. At the same time, the opening of switch 7' will cause the capacitor 15 to be charged again through resistor 16 and the coil of relay 17. When the voltage at the base of transistor $T_1$ has assumed a value sufficient for positively biasing this transistor $T_1$, the latter will again be conducting, like the output transistor $T_2$, and the coil of relay 17 will be re-energized, and the cycle will be resumed, and so forth.

The values of resistor 15 and capacitor 16 are calculated as a function of the desired or selected timing or cycle time.

Figure 6:
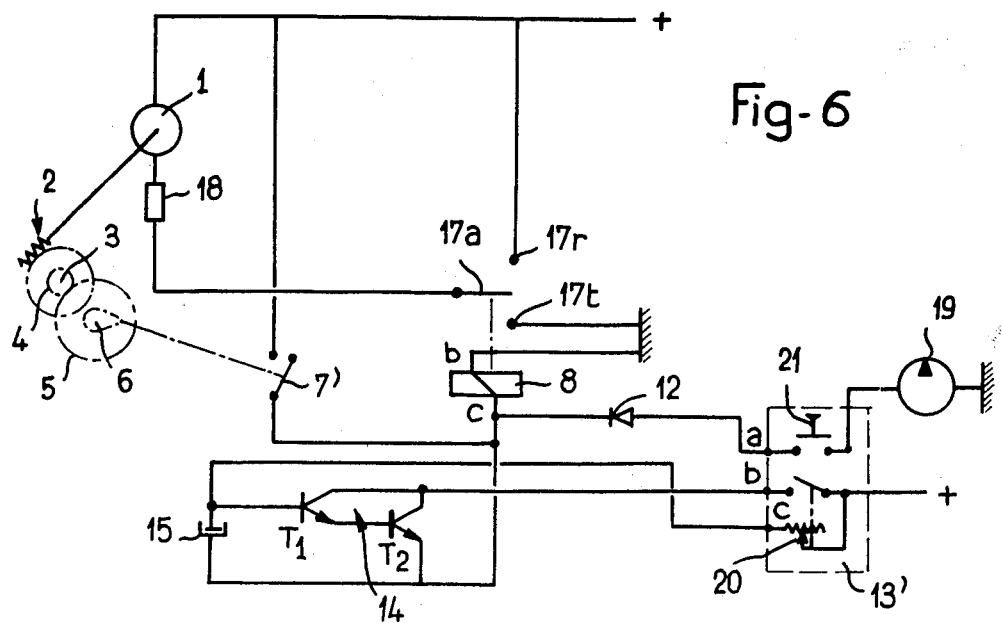
FIG. 6 shows the wiring diagram of a device similar to the device of FIG. 4, but comprising a rate adjusting potentiometer incorporated in the control switch.

As an alternative, a potentiometer 20 incorporated in a control switch 13' may be substituted for resistor 16, as illustrated in FIG. 6, whereby the timing of the device can be modified at will. The movable member of this potentiometer is connected to the + terminal of the current supply, in conjunction with the movable contact arm of said switch, to which it is also connected mechanically, so that the potentiometer variations can only take place when the switch contact arm is in the timing position b.

When this movable contact arm moves from position b to stop position c, two cases may arise:

(1) Switch 7' is closed: in this case, the relay contact arm 17a is in its front position (i.e. engaging the fixed contact 17t), and the motor 1 is kept in its energized condition until the cam 6 (or track 8') has completed its revolution and opens switch 7'. Then relay 17 is de-energized and its movable contact arm 17a resumes its inoperative or back position on contact 17r, thus restoring the short-circuit in the motor armature. The wiper is thus stopped and can be restarted only by actuating switch 13'.

(2) Switch 7' is in its open position corresponding to the back position and remains in this position. The charge of capacitor 15 through potentiometer 20 (or resistor 16) and the coil of relay 17 cannot start the timing device, since both transistors $T_1$ and $T_2$ are de-energized.

In both cases contemplated hereinabove, the capacitor charging is maintained so that the circuit can start immediately when subsequently actuating said switch 13'.

Incorporated in switch 13' is a push-button 21 having one terminal connected to terminal a (extension of operating time) and the other terminal connected to the washer pump 19.

Switching the control switch 13 of FIG. 4 (or 13' of FIG. 6) to the time extension position a, irrespective of the initial position (13c—stop position, or 13b—timing position) will energize the coil of relay 17 through the medium of diode 12 and cause the movable arm 17a of relay 17 to be moved to the front position (contact 17t). Thus, the motor 1 is energized and causes the cam 6 (or track 8') to rotate according to the above-described procedure. The electronic timing circuit is not energized. Switching the control switch 13 (or 13') to the stop position c causes the energization of the relay coil to be maintained during the time in which switch 7' is closed. When the cam 6 (or track 8') has accomplished a full revolution, switch 7' is open and relay 17 is de-energized; the movable arm 17a will resume its inoperative or back position by engaging contact 17r and the armature of motor 1 will be short-circuited.

The wiping time extension position permits of obtaining at will at least one complete wiping cycle. This is particularly advantageous when a washer pump 19 is associated with this supply position. The pump will be actuated automatically in the case of FIG. 4, and by the control action of the driver on pushbutton 21 in the case illustrated in FIG. 6.

If the component elements of the device of this invention were assembled and mounted according to the rules of hitherto or prior art devices, the following units and components would have to be assembled and mounted separately:

(a) a motor and reduction gear unit comprising the motor 1, reduction gear 2, 3, additional reduction gear 4, 5, cam 6 and fixed stop reversing switch (or switch 7');

(b) a relay 17 with its inverter and a timing device 14, incorporated as a rule in a common case;

(c) a control switch 13 or 13';

(d) the necessary wiring between the fixed-stop inverter or switch, and the motor;

(e) the necessary wiring between the switch and the timing device.

Considerable savings can be made by incorporating the relay 17, possibly the device 18 for protecting the motor, and the leads to and from inverter 7 (or switch 7') in the motor and reduction gear unit. However, electric motors comprise in general an insulating plate supporting the brush-holders, connecting leads and in certain cases a circuit breaker of which the fastening and wiring are not always easily accomplished.

Figure 7:
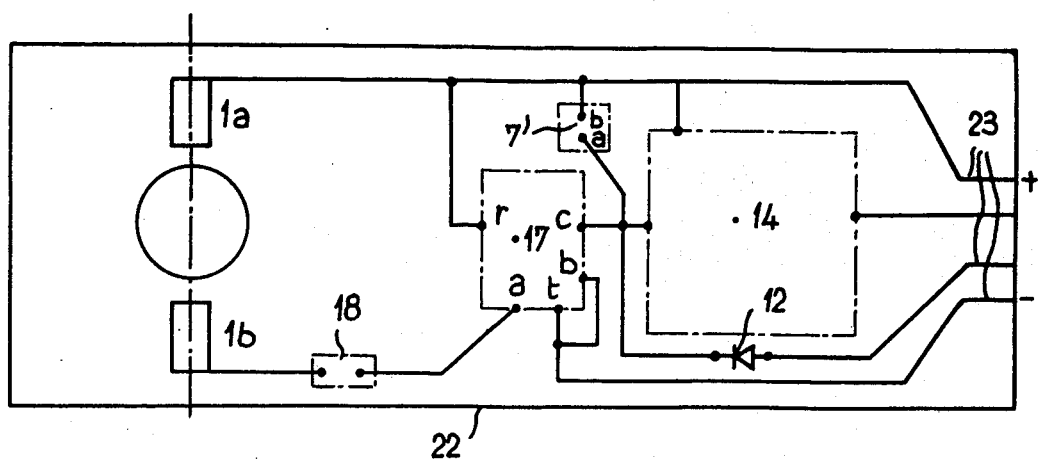
FIG. 7 shows in plane view a printed circuit plate for assembling the device of FIG. 4.
Figure 8:
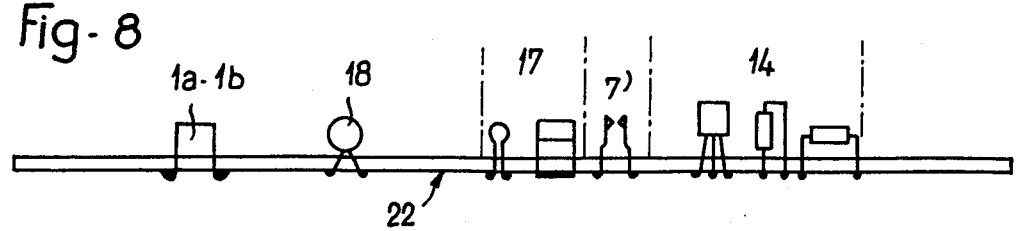
FIG. 8 is an elevational view of the plate of FIG. 7.

With the present invention, as illustrated in FIG. 7, it is possible to assemble for mounting the component elements of the device illustrated in FIG. 4 or 5 on a single conducting printed circuit plate 22 supporting at the same time the brush holders of motor 1, a single operation being sufficient for welding thereon simultaneously:

the brush holders 1a and 1b of motor 1;

a protection device 18 for the motor 1 (which may advantageously consist of a cheap wire-type thermal circuit breaker);

connecting terminals (a, b, c, r, t) of relay 17, so arranged that this relay can be plugged in directly;

the electronic component elements 15, 16, $T_1$, $T_2$ adapted to be branched through the plate, the latter furthermore comprising, if required, at one end, several lugs 23 incorporated in the circuit for receiving a matching printed-circuit coupler 24 provided at the end of the single fixed-stop motor-reduction gear unit and switch wiring system;

the wiring of the fixed stop switch 7' mounted directly on the printed circuit plate.

Properly designing the cases 25, 26 of the motor and reduction gear unit 1 to 6 as shown in FIGS. 9 to 14 permits a simple positioning of the printed circuit plate 22, the cases acting as protection housing for the electronic circuit component elements and having apertures 27, 28 and 29 for the plug-in relay 17, coupler 24 of printed circuit 22 and commutator of motor 1.

As illustrated in FIGS. 9 to 11, a first case 25 obtained by assembling the two halves a and b encloses the motor 1 and supports on one side one portion of the printed circuit plate 22 to which the brush holders 1a, 1b of motor 1 are secured. The other case 26, also consisting of two halves a and b, encloses the reduction gear 2 to 5 and the portion of plate 22 supporting the relay 17, switch 7', timing device 14 and coupler 24. Bent lugs 30, 31 formed integrally with said cases permit of securing the printed circuit plate 22 as illustrated in FIGS. 12 to 14.

What is claimed as new is:

1. A device for extending the operating time of wiper units of motor vehicles, more particularly of wipers for the windscreen, backlight and headlamps, which comprises a direct current electric motor, a first reduction gear unit having an output shaft for driving said wipers, a second reduction gear unit having a pinion and a toothed wheel, said pinion being operatively connected to the output shaft of said first gear unit and meshed with the toothed wheel of said second gear unit in such a manner that said toothed wheel completes one revolution each time said output shaft completes a fixed integer of revolutions, a control member which is rigidly fixed to said toothed wheel for automatically stopping the motor at the end of a preset wiping period, and control means for energizing said electric motor, said control means being deactivated by said control member each time said toothed wheel completes one revolution.

2. A device according to claim 1, wherein said direct current electric motor and second reduction gear unit includes a motor brush-holder supporting plate, case members being provided for enclosing said second gear unit, said control means being associated with a timing electronic device comprising electronic components and wherein the electric motor brush-holder supporting plate has mounted thereon an assembly for supporting the electrical and said electronic components and is protected by the case members.

3. An apparatus for stopping the rotation of an output shaft in a predetermined orientation, the output shaft being rotatably driven by a worm and worm wheel reduction gear for driving a wiper unit of a motor vehicle or the like, said worm of the reduction gear being rotatably driven by an electric motor, said apparatus comprising:

a pinion which is operatively connected to said output shaft;

a toothed wheel which is connected to said apparatus at a point separate from said output shaft, said toothed wheel being meshed with said pinion in such a manner that said toothed wheel completes one revolution each time said output shaft completes a fixed integer of revolutions; and switch means for de-energizing the motor to thereby stop the rotation of the output shaft in the predetermined orientation, said switch means including a first member rotatably solid with said toothed wheel, a switch for controlling energization of the motor, and a second member positioned so as to be movable by said first member during its rotation whereby movement of said second member moves the switch into a position deenergizing the motor.

4. An apparatus according to claim 3, wherein said first member of said switch means is a cam, and wherein said second member is a movable arm.

* * * * *